(12) United States Patent
Hirsch

(10) Patent No.: US 6,199,158 B1
(45) Date of Patent: Mar. 6, 2001

(54) METHOD AND APPARATUS FOR CONFIGURING VARIANT SOFTWARE FOR ELECTRONIC DEVICES

(75) Inventor: Andrew J. Hirsch, Euless, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/216,749

(22) Filed: Dec. 16, 1998

(51) Int. Cl.[7] .................................................. G06F 9/445
(52) U.S. Cl. ............................................................ 713/1
(58) Field of Search .................. 713/1, 2, 100

(56) References Cited

U.S. PATENT DOCUMENTS

| 5,196,842 | * | 3/1993 | Gomez et al. ................ 340/825.44 |
| 5,428,666 |   | 6/1995 | Fyfe et al. ............................ 379/58 |
| 5,768,224 | * | 6/1998 | Tanaka et al. ......................... 369/33 |
| 6,078,741 | * | 2/2000 | Ma et al. ................................ 703/24 |
| 6,083,007 | * | 7/2000 | Joliat et al. .......................... 434/262 |

FOREIGN PATENT DOCUMENTS

| 0 825 791 | 2/1998 | (EP) . |
| 2 292 047 | 2/1996 | (GB) . |
| 2 317 072 | 3/1998 | (GB) . |

* cited by examiner

Primary Examiner—Thomas M. Heckler
(74) Attorney, Agent, or Firm—Brian T. Rivers

(57) ABSTRACT

A method and apparatus for configuring an electronic device for operation according to one of a plurality of product variants. Upon initialization of the device for use, identifying data for the user of the device is entered into the device. The identifying data is used to determine a selected set of configuration data from one of a plurality of sets of configuration data that are stored in the device. The electronic device is then configured to operate according to a particular product variant defined by the selected set of configuration data.

14 Claims, 2 Drawing Sheets

METHOD AND APPARATUS FOR CONFIGURING VARIANT SOFTWARE FOR ELECTRONIC DEVICES

FIELD OF THE INVENTION

This invention relates to configuration of product variants and, more specifically, to a method and apparatus for configuring product variant software for electronic devices.

BACKGROUND OF THE INVENTION

In the manufacture of electronic devices, it may be common for a manufacturer to provide several or many variants of the same basic products. In certain cases the variant of the product may only differ in the type of software that controls the device.

In the case of mobile phones, for example, the physical design of the phone may be the same for all variants of a product, but some of the basic control features may operate differently. Typically, each customer of the manufacturer, typically a service provider, requires a different variant type having different control features. These basic control features could include wake-up graphics, default network settings, hiding or displaying control menu items, subscriber identity module (SIM), lock setting and encryption/decryption features.

Reworking of variants has become a commonplace practice in the manufacture of large-volume products, such as mobile phones. Because of inaccurate sales forecasts, large numbers of one or more variants may be stored in a distribution center as increased inventory. Existing mobile phones created of one variant type may then need to be converted quickly to a variant of another type for use by another service provider. Also, when a mobile phone is repaired, the repair may be done by replacing the transceiver unit of the phone with a standard transceiver. This standard transceiver unit then would have to be converted quickly and easily to the variant used by the service provider for which the phone was originally intended, or if the phone is placed back in general stock, to one of one or more variants used by other service providers.

SUMMARY OF THE INVENTION

The present invention provides a method and apparatus for configuring an electronic device for operation. The method and apparatus allows a number of electronic devices to be manufactured according to the same or similar product specifications and then to be configured as a particular variant of the product, at the point in time when final identifying data on the device is input to the device. The identifying data is then used to determine a selected set of configuration data from one of a plurality of sets of configuration data that are stored in the device. After the set of configuration data is determined, the device is configured to operate as a variant according to the selected set of configuration data. The identifying data may be, for example, subscriber identity data of a subscriber associated with a particular customer or service provider that requires a particular variant of the product.

In an embodiment of the invention, the method and apparatus is implemented in a mobile telephone that includes a subscriber identity module (SIM) programmed for each user. The mobile telephone includes a memory device in which are stored multiple sets of configuration data where each set of configuration data defines a unique operating configuration of a variant of the mobile telephone. The mobile telephone also includes software that is able to map identifying data in the SIM to a particular service provider and the variants required by the service provider for the user. The software also configures the electronic device accordingly. The identifying data could be, for example, the mobile country code/mobile network code MCC/MNC of a GSM system. When the SIM is initially placed in the mobile telephone, the identifying data is read from the SIM and the mobile station is automatically configured according to the appropriate variant, by matching the identifying data to a variant having a selected set of configuration data and setting flags in a section of the memory device in which the operating code for the mobile station is stored that cause the mobile station to operate according to the selected set of configuration data. The mobile station then operates as the particular variant associated with the configuration data.

In an alternate embodiment, the mobile station may be of a type that does not include a subscriber identity module. In this alternative embodiment, the identifying data utilized to configure the mobile station or a particular variant may be the first SID/SOC subscriber identity/system operator code combination that is programmed into the phone.

BRIEF DESCRIPTION OF THE DRAWINGS

The above set forth and other features of the invention are made more apparent in the ensuing Detailed Description of the Invention when read in conjunction with the accompanying drawings wherein.

DETAILED DESCRIPTION OF THE INVENTION

Figure 1:
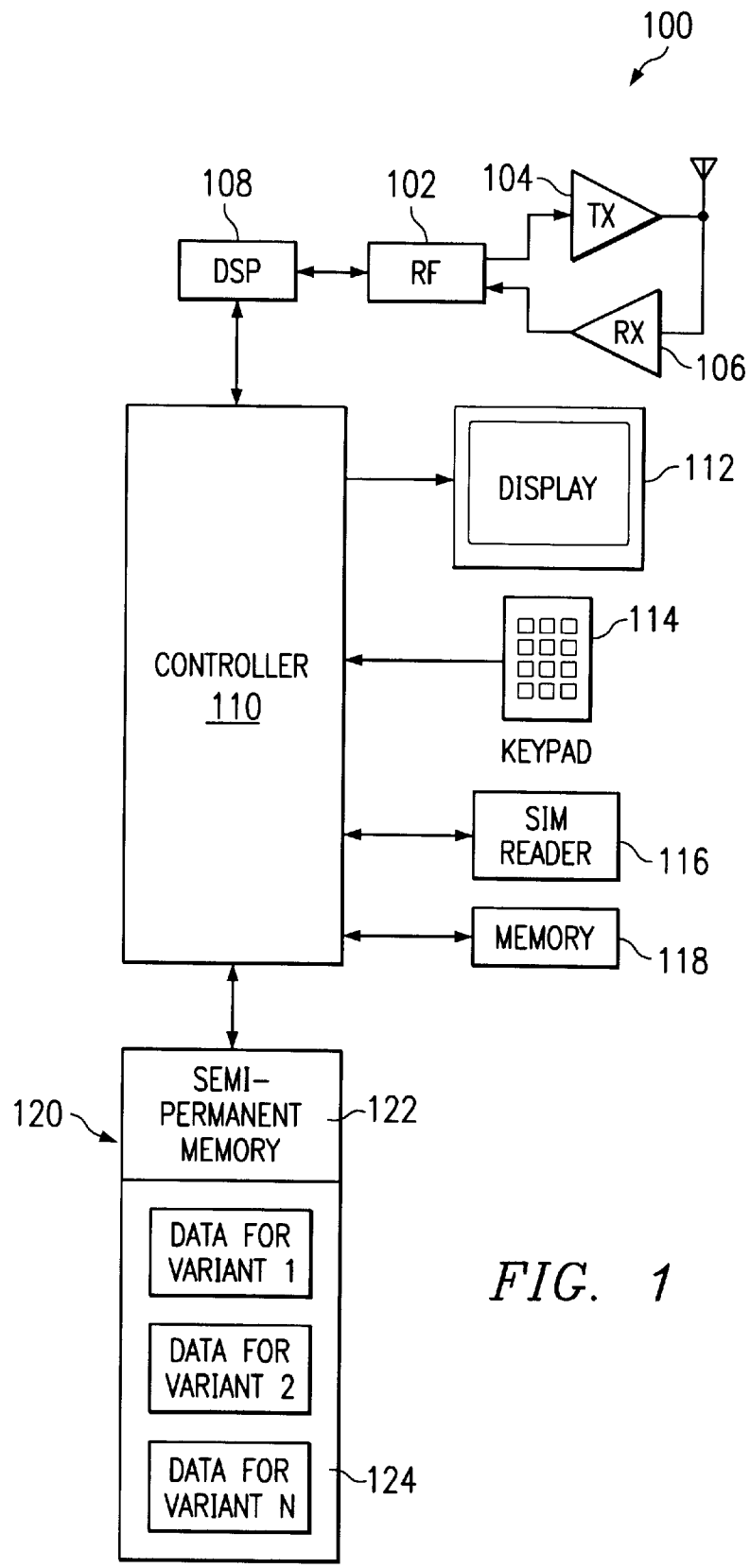
FIG. 1 illustrates a block diagram of a mobile station constructed according to an embodiment of the invention.

FIG. 1 illustrates a block diagram of a mobile station constructed according to an embodiment of the invention. Mobile station 100 includes RF circuitry 102, a transmitter (TX) 104, a receiver (RX) 106, digital signal processing circuitry (DSP) 108a and controller 110. TX 104 and RX 106 transmit and receive signals, respectively, from the cellular system in which mobile station 100 is operating. RF circuitry 102 converts baseband signals from DSP 108 to RF for transmission from TX 104 or converts RF signals received from RX 106 to baseband for processing in DSP 108.

Mobile station 100 can be capable of operating with one or more air interface standards, modulation types and access types. For example, mobile station 100 may operate in accordance with the Global System for Mobile Communications (GSM) or GSM-based PCS 1900 or DCS 1800 standards.

Mobile station 100 also includes a user interface that includes display 112 and a user input device, typically a keypad 114, coupled to controller 110. Subscriber identity module (SIM) reader 116 interfaces with a SIM that is placed in mobile station 100. The SIM is typically an integrated circuit that is placed in a socket in the mobile station. In the embodiment of the invention, the SIM is implemented according to the GSM specification and includes identity information comprising the system operator's mobile country code (MCC), mobile network code (MNC) and a group identifier (GID) that allow mobile station 100 to operate in the system. The MCC identifies the country of operation. The MNC identifies a particular network within the country identified by the MCC. A service provider that operates a particular network may be identified by the MCC/MNC. The GID is an optional field that may be used to identify a particular group of mobiles from among mobiles having the same MCC/MNC. The GID may be used, for example, to identify a group of mobile stations assigned by the network operator (service provider) to a secondary service provider for use in the network.

Mobile station 100 also includes memory 118 and semi-permanent memory 120. Memory 118 is used to store and retrieve data during operation of the mobile station 100. Semi-permanent memory 120 includes memory portion 122 and memory portion 124. Memory portion 122 stores a code that includes flags that may be set to cause mobile station 100 to operate according to a particular variant, for example, hiding/displaying of a 911 menu, wake-up graphics, default network settings and SIM-lock settings. Memory portion 124 includes the configuration data for variants 1-N. Also, stored in memory portion 122 is mapping data that includes data that matches particular MCC/MNC combinations to one of the sets of configuration data for variants 1-N. The MCC/MNC combination may be mapped by associating an MCC/MNC to a particular customer (service provider) and the variant type for that service provider. If necessary, GID information may also be mapped to distinguish between different variants that may have the same MCC/MNC.

Figure 2:
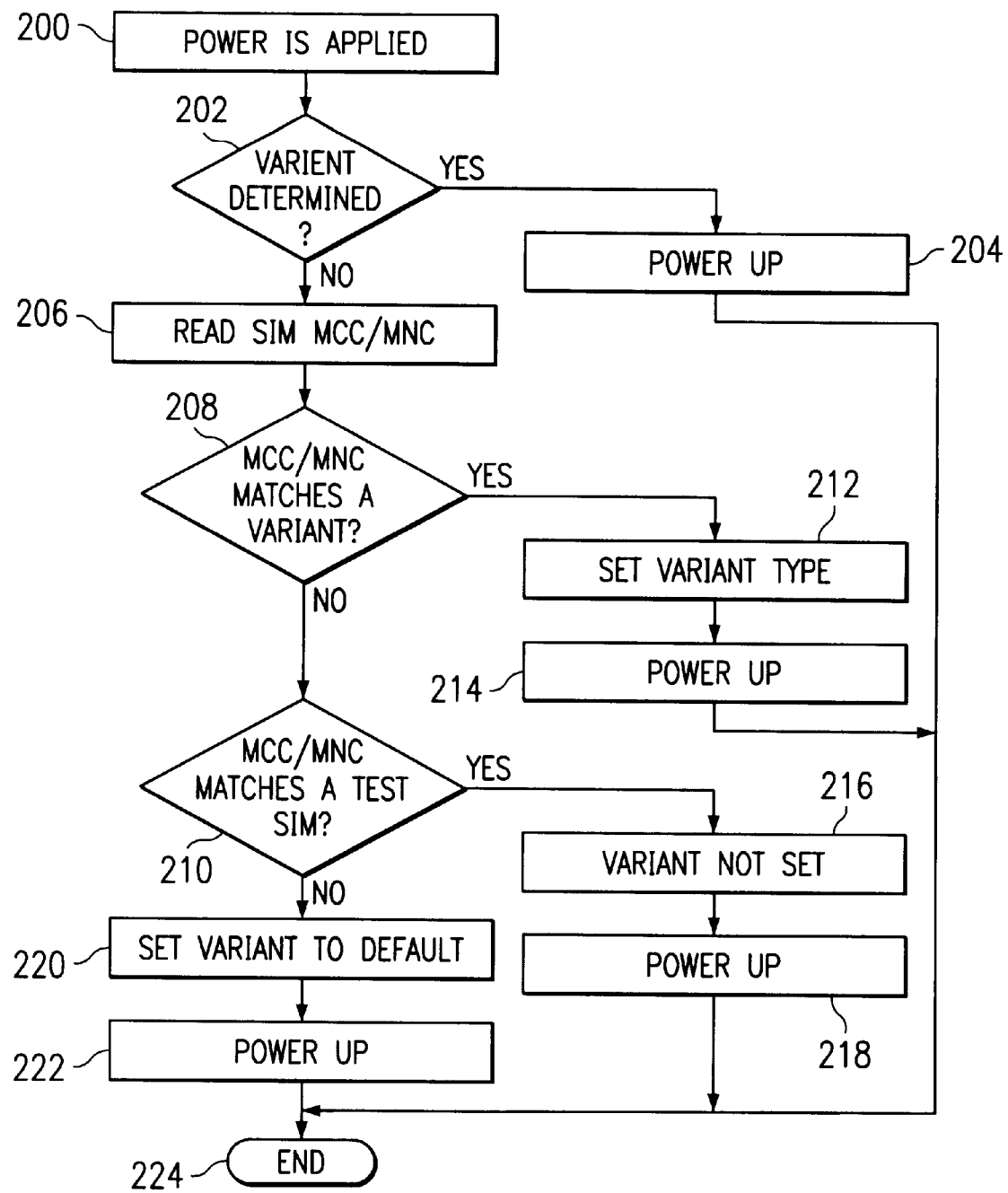
FIG. 2 is a flow diagram illustrating process steps performed according to an embodiment of the invention.

Referring now to FIG. 2, therein is a flow diagram illustrating process steps according to an embodiment of the invention. FIG. 2 illustrates the process as performed by controller 110 of FIG. 1 according to input received from SIM reader 116 and code stored in memory 118.

The process begins at step 200 when power is applied to mobile station 100. At step 202 controller 110 determines whether a variant has previously been determined and configured for mobile station 100. If the variant configuration process of FIG. 2 has been previously performed, a variant will have been previously configured and the process will move to step 204, where power-up of mobile station 100 is completed. The process then ends at step 224. If, however, power has been applied for the first time to mobile station 100 or a previously programmed variant configuration has been removed by reprogramming, after repair, for example, the process moves to step 206.

At step 206, controller 110 reads the MCC/MNC data from SIM reader 116. Next, at step 208, a determination is made as to whether or not the MCC/MNC matches a variant type having a set of configuration data stored in memory portion 124 of memory 120. If it is determined that the MCC/MNC matches a variant type, the process moves to step 212. At step 212, controller 110 configures one or more flags in memory portion 122 of memory 120 so that mobile station 110 operates according to the set of configuration data for the matched variant type. The process then moves to step 214, where power-up of mobile station 100 is completed. The process then ends at step 224. If, however, at step 208, it is determined that the MCC/MNC does not match a variant type, the process moves to step 210.

At step 210, controller 110 makes a determination as to whether or not the MCC/MNC matches a test SIM MCC/MNC. A test SIM would be placed in the mobile station for testing purposes only, and it would not be necessary and desirable to configure a variant type during testing. If it is determined that the MCC/MNC matches a test SIM MCC/MNC, the process moves to step 216. At step 216, mobile station 100 is operated in a test mode in which a variant is not configured. The process then moves to step 218 where power-up of the mobile station 100 is completed. The process then ends at step 224. If, however, at step 210, it is determined that the MCC/MNC does not match a test SIM MCC/MNC the process moves to step 220.

At step 220, controller 220 configures one or more flags of memory portion 122 of memory 120 so that mobile station 100 operates according to the set of configuration data for a default variant type. The set of configuration data for the default variant type may be stored as one of the sets of data for variants 1-N and may be used when a particular service provider uses a default variant rather than a variant configured especially for that service provider. The process then moves to step 222 where power-up of mobile station 100 is completed. The process then ends at step 224.

In an alternative embodiment, steps 206, s08 and/or step 2210 may include determining the variant by using a GID that is read from the SIM in addition to the MCC/MNC.

In an another alternative embodiment, the invention may be implemented in a mobile station that does not use a SIM module. In this case the identity information matched to a particular variant could include a system identification/system operator code (SID/SOC). The variant configuration could be implemented according to the first SID/SOC code that is programmed into the mobile station. In this alternative embodiment, the mobile station may operate according to, for example, the TIA/EIA/IS-95 Mobile Station-Base Station Compatibility Standard for Dual Mode Wide Bank Spread Spectrum Cellular Systems (IS-95) or the TIA/EIA/IS-136 Mobile Station-Base Station Compatibility Standard (IS-136).

This invention has application to various types of electronic devices and systems. For example, the method and apparatus may be implemented in other types of electronic devices in which data identifying a particular user or customer matchable to a particular variant configuration is entered into the device upon initialization for use. The method and apparatus may also be implemented in third generation telecommunications systems that are being specified to be implemented in place of GSM, IS-136 or IS-95 systems. Accordingly, although the invention has been particularly shown and described with respect to preferred embodiments thereof, it will be understood by those skilled in the art that changes inform and details may be made thereon without departing from the scope and spirit of the invention.

What is claimed is:

1. A method for configuring an electronic device for operation, said method comprising the steps of:

storing a plurality of sets of configuration data in a memory device in said electronic device, wherein said plurality of sets of configuration data comprises a plurality of sets of variant configuration data, each associated with at least one identifier of a set of identifiers, and a set of default configuration data and wherein each of said plurality of sets of configuration data defines an operating configuration for said electronic device;

receiving identity data at said electronic device;

determining if said identity data received in said step of receiving can be matched to an identifier associated with a selected set of variant configuration data of said plurality of sets of variant configuration data; and in response to a positive determination:

configuring said electronic device for operation according to said selected set of variant configuration data, or, in response to a negative determination:
matching said set of default configuration data to said identity data, and configuring said electronic device for operation according to said set of default configuration data.

2. The method of claim 1, wherein said step of receiving identity data comprises receiving identity data from a subscriber identity module inserted in said electronic device.

3. The method of claim 2, wherein said subscriber identity module comprises a Global System for Mobile Communication (GSM) subscriber identity module.

4. The method of claim 3, wherein said step of determining a selected set of said plurality of sets of configuration data comprises the steps of:

determining a mobile country code/mobile network code (MCC/MNC) from said identity data; and matching said MCC/MNC to a selected set of said plurality of sets of configuration data.

5. The method of claim 3, wherein said step of determining a selected set of said plurality of configuration data comprises the steps of:

determining a group identifier (GID) from said identity data; and matching said GID to a selected set of said plurality of sets of configuration data.

6. The method of claim 1, wherein said step of receiving identity data comprises receiving identity data programmed into said electronic device upon initialization for use.

7. The method of claim 6, wherein said identity data comprises a system identification/system operator Code (SID/SOC).

8. An apparatus for configuring a electronic device for operation, said apparatus comprising:

a memory device for storing a plurality of sets of configuration data in said electronic device, wherein said plurality of sets of configuration data comprises a plurality of sets of variant configuration data, each associated with at least one identifier of a set of identifiers and a set of default configuration data, and wherein each of said plurality of sets of configuration data defines an operating configuration for said electronic device;

an input device for receiving identity data at said electronic device; and a processor coupled to said memory device and said input device, said processor for receiving said identity data from said input device, determining a selected set of said plurality of sets of configuration data by determining if said identity data from said input device matches an identifier associated with any of said plurality of sets of variant configuration data, and configuring said electronic device for operation according to said selected set of configuration data.

9. The apparatus of claim 8, wherein said apparatus further comprises a socket coupled to said input device, said socket for receiving a subscriber identity module, and wherein said identity data received by said input device comprises subscriber identity module data.

10. The apparatus of claim 9, wherein said identity data includes an mobile country code/mobile network code (MCC/MNC), and wherein said processor determines said selected set of said plurality of sets of configuration data by matching said MCC/MNC to a selected set of said plurality of sets of configuration data.

11. The apparatus of claim 9, wherein said identity data includes a group identifier (GID), and wherein said processor determines said selected set of said plurality of sets of configuration data by matching said GID to a selected set of said plurality of sets of configuration data.

12. The apparatus of claim 8, wherein said processor further configures said electronic device for operation according to said set of default configuration data in the event said processor determines that said identity data does not match any identifier associated with any of said plurality of sets of variant configuration data.

13. The apparatus of claim 9, wherein said identity data includes identity data programmed into said electronics device upon initialization for use.

14. The apparatus of claim 13, wherein said identity data comprises an system identification/system operator code (SID/SOC).

* * * * *

(12) EX PARTE REEXAMINATION CERTIFICATE (10349th)

United States Patent
Hirsch

(10) Number: US 6,199,158 C1
(45) Certificate Issued: Oct. 22, 2014

(54) METHOD AND APPARATUS FOR CONFIGURING VARIANT SOFTWARE FOR ELECTRONIC DEVICES

(75) Inventor: Andrew J. Hirsch, Euless, TX (US)

(73) Assignee: Nokia Mobile Phones Limited, Espoo (FI)

Reexamination Request:
No. 90/013,066, Nov. 27, 2013

Reexamination Certificate for:
Patent No.: 6,199,158
Issued: Mar. 6, 2001
Appl. No.: 09/216,749
Filed: Dec. 16, 1998

(51) Int. Cl.
*H04M 1/725* (2006.01)
*H04M 1/72* (2006.01)
(52) U.S. Cl.
USPC ............................................................. 713/1

(58) Field of Classification Search
None
See application file for complete search history.

(56) References Cited

To view the complete listing of prior art documents cited during the proceeding for Reexamination Control Number 90/013,066, please refer to the USPTO's public Patent Application Information Retrieval (PAIR) system under the Display References tab.

*Primary Examiner* — Salman Ahmed

(57) ABSTRACT

A method and apparatus for configuring an electronic device for operation according to one of a plurality of product variants. Upon initialization of the device for use, identifying data for the user of the device is entered into the device. The identifying data is used to determine a selected set of configuration data from one of a plurality of sets of configuration data that are stored in the device. The electronic device is then configured to operate according to a particular product variant defined by the selected set of configuration data.

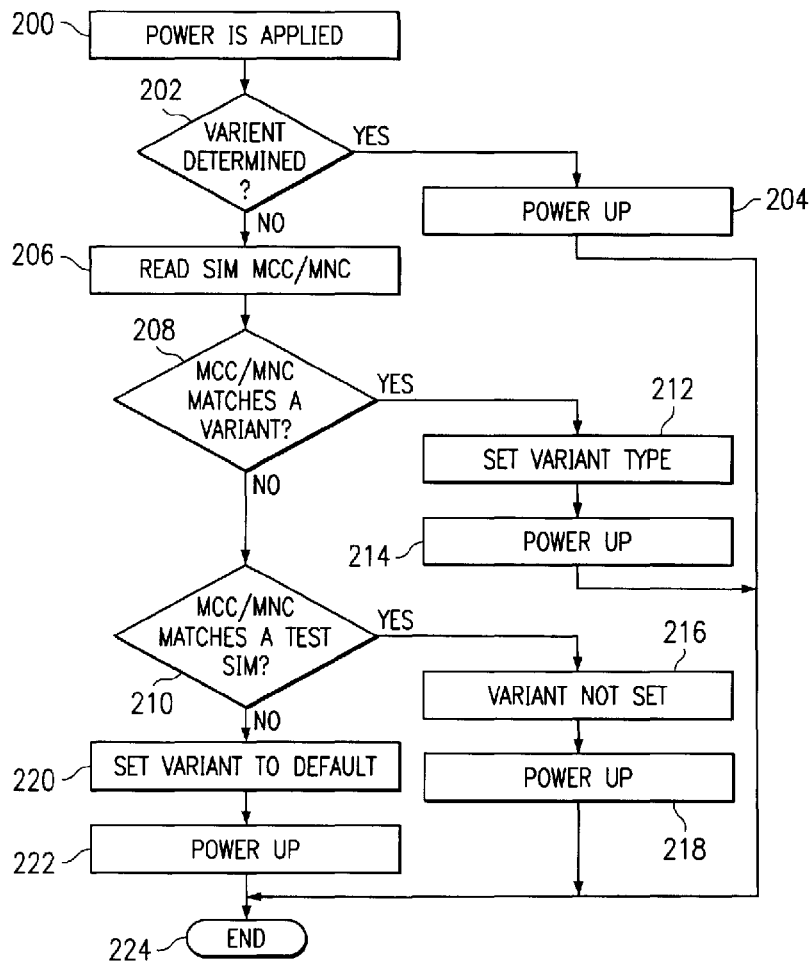

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-14 are cancelled.

\* \* \* \* \*